United States Patent Office 3,040,044
Patented June 19, 1962

3,040,044
TRIHALO - 2,4 - DIOXOHEXAHYDRO - 1,3,5 - TRIAZINES AND METHOD OF PREPARING SAME
Alfred Hirsch and Frank B. Slezak, Painesville, Ohio, assignors to Diamond Alkali Company, Cleveland, Ohio, a corporation of Delaware
No Drawing. Filed June 19, 1958, Ser. No. 743,223
3 Claims. (Cl. 260—248)

The present invention relates to novel compounds represented by the structure:

(I) 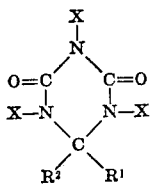

wherein X is halogen, i.e., fluorine, chlorine, bromine or iodine; $R^1$ and $R^2$ are selected from the group consisting of hydrogen atoms, alkyl radicals, such as methyl, ethyl, propyl, butyl, and the like and their isomers; aryl radicals, such as phenyl and naphthyl radicals; alkaryl radicals, such as toluyl or xylyl radicals; aralkyl radicals, such as benzyl and phenethyl radicals and halogen-substituted derivatives of the foregoing; and to the preparation and application of such compounds.

A preferred type of compound within the scope of the present invention comprises compounds represented by the structure:

II 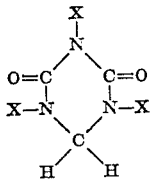

wherein X is halogen, preferably chlorine.

Another preferred type of compound of this invention may be represented by the structure:

(III) 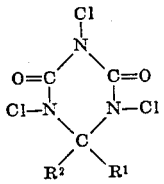

wherein $R^1$ and $R^2$ are as previously defined.

Specific illustrative compounds within the scope of the present invention are 1,3,5-trichloro-2,4-dioxohexahydro-1,3,5-triazine, which is preferred; 6-phenyl-1,3,5-trichloro-2,4-dioxohexahydro-1,3,5-triazine; 6-methyl-1,3,5-trichloro-2,4-dioxohexahydro-1,3,5-triazine; and 6,6-dimethyl-1,3,5-trichloro-2,4-dioxohexahydro-1,3,5-triazine.

Compounds within the scope of generic Structure I may be prepared by chemically reacting a compound of the structure:

(IV) 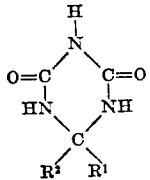

wherein $R^1$ and $R^2$ are as defined, with a halogenating agent, notably a halogen, preferably chlorine. In general, it is preferred to employ substantially stoichiometric ratios of the reactants. However, considerable departure from these ratios can be tolerated in many instances without serious detriment to either yield or quality of product. Typically, 1 mol of the triazine is mixed with about 3.24 mols of halogen. Preferably, a slight molar excess of the halogen, e.g., chlorine, is added to the reactant mixture, such as a 5% to 10% excess.

The chlorination is typically carried out while maintaining the pH of the reaction mixture between 10.5 and 0.5, such as chlorinating the respective triazine beginning with a pH of 10.5 and ending with a pH of 0.5. The preferred pH range is 2 to 7, specifically 2 to 3, the pH being controlled by means common in the art such as in the addition of a buffering solution; however, this control is preferably maintained by the addition of a neutralizing agent such as sodium hydroxide, sodium bicarbonate, or sodium acetate.

The reaction is somewhat exothermic in certain instances and cooling may be employed to advantage; the reaction may be carried out at a temperature between 5° and 35° C., typically at room temperature, i.e., 20° to 25° C. The reaction time is usually about ½ to 3 hours, 1 to 2 hours generally being preferred.

The reaction is preferably carried out in the presence of a solvent such as water but may also be carried out in the presence of an organic solvent such as t-butyl alcohol or a chlorinated hydrocarbon, e.g., chlorinated benzene, such as monochlorobenzene or dichlorobenzene, carbon tetrachloride, and ethylene dichloride.

The desired product, typically having a halogen content of about 65% to 98%, may be purified conveniently through recrystallization from water or an organic solvent such as benzene, chloroform, carbon tetrachloride and/or mixtures of these solvents. Distillation of these compounds generally is not feasible in view of their high reactivity and tendency to decompose upon heating to conventional distillation temperatures.

Compounds within the scope of generic Structure II above may be prepared by halogenating a compound of the Structure IV above, wherein $R^1$ and $R^2$ are hydrogen. Essentially the same reaction conditions can be employed in the preparation of these compounds as are disclosed for preparation of compounds of generic Structure I above. Compounds within the scope of generic Compound II above may be prepared similarly by chlorinating a compound of Structure IV above.

Specific compounds of this invention, such as 1,3,5-trichloro-2,4-dioxohexahydro-1,3,5-triazine and 6-phenyl-1,3,5-trichloro-2,4-dioxohexahydro-1,3,5-triazine are prepared under essentially the same reaction conditions previously set forth.

The novel triazine compounds of this invention are useful as chemical intermediates and exhibit a high degree of biological activity, in addition to finding application in the field of battery components such as employment as cathode materials for primary batteries. More specifically, these compounds are active pesticides such as for the control of micro-organism growth and fungicides such as for the control of blight fungi.

While compounds of this inventoin demonstrate biological activity, it is also significant that these N-halogen organic compounds are <u>strong oxidizing agents</u> having properties which lend themselves to applications in the field of batteries, and specifically to application as cathode materials in primary batteries.

Typically a cathode containing an active amount of a compound within the scope of Structure I, e.g., a 1,3,5-trihalo-2,4-dioxohexahydro-1,3,5-triazine is constructed by intimately mixing the triazine with a cathode carrier such as graphite or magnetite, e.g., mixing about two parts by weight of the triazine with one part by weight of carbon, i.e., graphite. The resulting mixture is placed in a mold, e.g., a paper-lined can and a carbon rod is then inserted. The electrode thus formed may then be manufactured into a cell, such as that constructed by removing the thus-formed electrode from the mold, wrapping with a piece of absorbent nonwoven fabric material and magnesium sheet. Discharge may be obtained by immersing the foregoing assembly in an electrolyte, i.e., a solution comprising essentially an aqueous solution of magnesium bromide, e.g., 250 g. of $MgBr_2$ in 1 liter of water, and/or an aqueous solution of sodium dichromate, e.g., 1.0 g. of $Na_2Cr_2O_7$ in 1 liter of water.

A preferred embodiment of the present invention is a battery containing a cathode having as an active ingredient a compound according to Structure I.

Another embodiment would be a battery comprising an anode, electrolyte, and cathode; containing as an active ingredient a compound according to Structure I. The preferred compound in these embodiments is 1,3,5-trichloro-2,4-dioxohexahydro-1,3,5-triazine.

The effectiveness of these new cathode materials may also be demonstrated employing the technique and apparatus disclosed in an article by C. K. Morehouse and R. Glickman in The Journal of the Electrochemical Society, vol. 103, No. 2, page 94.

The halogenated 1,3,5-triazines have also demonstrated utility as bleaching agents, which activity is further enhanced by the fact that compounds of this invention are normally solids and thus inherently provide a significant improvement over many prior conventional bleaching and sanitizing agents including the well-known and widely-used sodium hypochlorite solution. Moreover the fact that compounds of this invention are solids provides increased convenience by way of easier handling and reduced likelihood of incurring damage by breakage, freezing or spilling.

An embodiment of the invention is a sanitizing composition, that is, a composition employed in contacting or destroying conditions, organisms, or bacteria detrimental to either human or animal life, containing a sanitizing amount of a compound within the scope of Structure I. This is intended also to include carriers for the subject toxic ingredients. In practice, the method of sanitizing may be carried out by contacting the detrimental conditions, i.e., organisms, bacteria, and material, space or area infested, with a santizing amount of a compound within Structure I. It is obvious that the amount of toxic agent or sanitizing composition required will be dictated by the degree of infestation and the degree of sanitation needed or desired and the material or environment to be sanitized.

It is also a specific feature of this invention that compounds of the foregoing type are advantageously employed, not only singly, but in admixture wherein in many instances a synergistic effect is observed insofar as bleaching and sanitizing activity is concerned.

In relation to utility as a bleaching and sanitizing agent a preferred embodiment of the present invention comprises a mixture of water and a compound within the scope of Structure I, e.g., a sanitizing or bleaching composition comprising essentially water and about 0.0001% to 10% by weight of a 1,3,5-trichloro-2,4-dioxohexahydro-1,3,5-triazine typically in combination with 0% to 10% by weight of a wetting agent.

While compounds of this invention may be employed in a variety of applications, biologically-active or otherwise, when employed as biologically-active materials and sanitizing or bleaching compositions, it will be understood, of course, that such compounds may be utilized in diverse formulations, both liquid and solid, including finely-divided powders and granular materials, as well as liquids such as solutions, concentrates, emulsifiable concentrates, slurries and the like, depending upon the application intended and the formulation media desired.

These compounds may be used alone or in combination with other known biologically-active materials such as other organic phosphate pesticides, chlorinated hydrocarbon insecticides, foliage, and soil fungicides, pre- and post-emergent herbicides, and the like.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, phosphates, silicates, diatomaceous earth, talc, spent catalyst, alumina silica materials, liquids, solvents, diluents or the like, including water and various organic liquids such as chlorinated benzene, acetone, cyclohexanone, xylene, chlorinated xylene, carbon disulfide, carbon tetrachloride, ethylene dichloride, and various mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X-155 (alkyl aryl polyether alcohol, U.S. Patent 2,504,064).

The term "carrier" as employed in the specification and claims is intended to refer broadly to materials constituting a major proportion of a biologically-active or other formulation and hence, includes finely-divided materials, both liquid and solid, as aforementioned, conveniently used in such application.

In order that those skilled in the art may more completely understand the present invention and the preferred methods by which the same may be carried into effect, the following specific examples are offered:

EXAMPLE I

*Preparation of 1,3,5-Trichloro-2,4-Dioxohexahydro-1,3,5-Triazine*

23 g. (0.2 mol) of 2,4-dioxohexahydro-1,3,5-triazine is suspended in 500 ml. of water. To this mixture is added 46 g. (0.648 mol) of chlorine over a period of about 2 hours with constant stirring while maintaining the pH of the reaction mixture between 2.0 and 2.5 by the dropwise adidtion of aqueous 6 N sodium hydroxide solution. The reaction temperature is maintained between 9° and 13° C. After addition of chlorine the desired product is filtered, washed with water, recrystallized from a chloroform-carbon tetrachloride mixture and dried. This product, $C_3H_2Cl_3N_3O_2$, melts at 137° to 138° C. and is greater than 5% soluble in acetone, cyclohexanone and xylene while being less than 5% soluble in water, and is indicated through the following elemental analytical data:

| Element | Actual percent by Wgt. | Calculated percent by Wgt. |
|---|---|---|
| C | 16.64 | 16.48 |
| H | 0.8 | 0.9 |
| Cl | 47.4 | 48.7 |
| N | 19.3 | 19.2 |

EXAMPLE II

In order to evaluate bactericidal activity, 1,3,5-trichloro-2,4-dioxohexahydro-1,3,5-triazine is mixed with distilled water containing 5% acetone and 0.01% Triton X-155 at concentrations of 32, 16, 8, and 4 p.p.m. 5 ml. of the test formulation are put in each of 4 test tubes. To each test tube is added one of the organisms: *Erwenia amylovora, Xanthomonas phaseoli, Staphylococcus aureus* and *Escherichia coli* in the form of a bacterial suspension in a saline solution from potato-dextrose agar plates. The tubes are then incubated for 4 hours at 30° C. Transfers are than made to sterile broth with a standard 4 mm. loop and the thus-innoculated broth is incubated for 48 hours at 37° C. Using this procedure, the product of Example I affords complete bactericidal control at concentrations given above.

EXAMPLE III

To test herbicidal activity and phytotoxic effects, tomato plants, variety Bonny Best, 5 to 7 inches tall; corn, variety Cornell M-1 (field corn), 4 to 6 inches tall; bean, variety Tendergreen, just as the trifoliate leaves are beginning to unfold; and oats, variety Clinton, 3 to 5 inches tall, are sprayed with an aqueous test formulation (0.64% test chemical—5% acetone—0.01% Triton X-155—balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure, the product of Example I receives ratings of 0, 2, and 0 for the tomato, corn, and oat plants, respectively; the bean plants being completely defoliated.

EXAMPLE IV

In order to demonstrate fungicidal activity of the product of Example I, a tomato foliage disease test is run measuring the ability of the product of Example I to protect tomato foliage against infection by the early blight fungus, *Alternaria solani*, and the late blight fungus, *Phytophthora infestans*. The method employs tomato plants 5 to 7 inches high of the variety Bonny Best. Duplicate plants, one set for each test fungus, are sprayed with 100 ml. of the test formulation at a toxicant concentration (256 p.p.m. product of Example I—5% acetone—0.01% Triton X-155—balance water) using 40 lbs. air pressure while being rotated on a turntable in a spray chamber. After the spray deposit is dry, the treated plants, and comparable untreated controls, are sprayed with a spore suspension containing approximately 20,000 conidia of *A. solani* per ml. or 150,000 sporangia of *P. infestans* per ml. The atomizer used delivers 20 ml. in 30 seconds.

The thus-treated plants are held in a saturated water vapor atmosphere for 24 hours at 70° F. for early blight and 60° F. for late blight to permit spore germination and infection before removal to a greenhouse. After 2 to 4 days, lesion counts are made on the three uppermost fully expanded leaves. The data are converted to percent disease control based on the number of lesions obtained on the control plants; employing the above procedure, 1,3,5-trichloro-2,4-dioxohexahydro-1,3,5-triazine affords 70% control for the early blight and 93% control for the late blight, respectively.

EXAMPLE V

Bean, variety Tendergreen, and tomato, variety Bonny Best, plants growing in 4 inch pots are treated by pouring a test formulation (2000 p.p.m. product of Example I—5% acetone—0.01% Triton X-155—balance water) into the pots at an equivalent rate of 128 lbs./acre (102 mg./pot.). The tomato plants are 3 to 4 inches tall and the trifoliant leaves just starting to unfold at the time of treatment. The bean plants are exposed to early blight continuously after seedling emergence so that at the time of treatment infection has occurred. After 10 to 14 days, observation indicates better than 40% disease control by comparison to the control plants.

EXAMPLE VI

Further to demonstrate fungicidal activity, 10-day old Pinto bean plants, 4 plants per 4 inch pot, are used. The product of Example I is applied to the soil around the growing bean plants in a test formulation (0.2% 1,3,5-trichloro-2,4-dioxohexahydro-1,3,5-triazine—5% acetone—0.01% Triton X-155—balance water), the concentration of test chemical being equivalent to 128 lbs./acre. Immediately following application of the test chemical to the soil surrounding the plants, the plants are sprayed with a spore suspension of the rust fungus, *Uromyces phaseoli*, prepared by taking 30 mg. of freshly harvested spores and mixing with 48 mg. of talc. This mixture is then diluted with water at the rate of about 1 mg. of the talc-spore mixture to 1.7 ml. of distilled water.

After spraying the spores on the seed leaves, the bean plants are placed in a saturated atmosphere for 24 hours at 60° F. Upon incubation the plants are placed under controlled greenhouse conditions and 9 to 10 days after exposure, rust lesions are counted. The data observed are converted to precentage disease control based on the number of lesions obtained on the control plants. Using this procedure results indicate better than 90% disease control at the above concentration.

EXAMPLE VII

*Preparation of 6-phenyl-1,3,5-Trichloro-2,4-Dioxohexahydro-1,3,5-Triazine*

15.3 g. (0.8 mol) of 6-phenyl-2,4-dioxohexahydro-1,3,5-triazine is suspended in 500 ml. of water. To this mixture is added 18 g. (0.253 mol) of chlorine while maintaining the pH of the reaction mixture between 2.0 and 2.8 by the dropwise addition of aqueous 6 N sodium hydroxide solution. The resultant $C_9H_6Cl_3N_3O_2$, melting at 248° to 249° C. is indicated through the following elemental analytical data:

| Element | Actual percent by Wgt. | Calculated percent by Wgt. |
| --- | --- | --- |
| C | 36.8 | 36.8 |
| Cl | 35.1 | 36.2 |
| N | 14.5 | 14.3 |

EXAMPLE VIII

In order ot evaluate the bleaching efficiency of the compounds of the present invention, a test is carried out whereby 1,3,5-trichloro-2,4-dioxohexahydro-1,3,5-triazine is employed in the bleaching of tea-stained muslin. In this test, ordinary muslin is stained until a reflectance reading of about 68 is obtained on a Hunter multipurpose reflectometer. A laundrometer commercially available from the Atlas Electric Devices Company, Model P5, Type LHD-ES is employed in each of the evaluations. Upon the completion of the staining of the muslin, a bleach solution is made up comprising a 5% aqueous solution of sodium tripolyphosphate. In order to adjust the available chlorine content of the bleach bath to the level of 300 p.p.m., suitable amounts of a concentrated solution of the respective bleach is added to the bath and available chlorine concentration is checked just prior to running the test by titration against sodium thiosulfate using iodine starch as the indicator. Two test strips of scoured, unbleached, tea-stained muslin are employed as the check and are added to a Mason jar containing 300 ml. of the above 5% sodium tripolyphosphate solution and the 300 p.p.m. of available chlorine. These jars are then immersed in the water bath of the laundrometer for a period of about 20 minutes. At the end of the bleaching treatment, the strips are washed with cold water, dried and ironed. Reflectance of the bleach samples is then evaluated on the Hunter Reflectometer. Comparing the results with the reflectance of the sample before bleaching, results are indicated as percent increase in whiteness. Employing this procedure and the product of Example I, at a concentration of 300 p.p.m. available chlorine and employing 1,3-dichloro-5,5-dimethylhydantoin as a commercial comparison, the results indicate at the above concentration, a pH of 9.3, and a temperature of 120° F., 104.5% increase in whiteness whereas the commercial check demonstrates 99.9% increase in whiteness.

EXAMPLE IX

The following are illustrative bleaching and sanitizing formulations embodying the present invention and suitable wetting agents in detergent compositions. Typically the preferred composition of the present invention comprises 10 to 35 parts by weight of the chlorinated 2,4-dioxohexahydro-1,3,5-triazine, 0 to 50 parts by weight sodium sulfate, 0 to 25 parts by weight mono basic sodium phosphate hydrate ($NaH_2PO_4 \times H_2O$), 0 to 75 parts by weight sodium tripolyphosphate, and 0 to 10 parts by weight of wetting agent.

It is to be understood that although the invention has been described with specific reference to particular embodiments thereof, it is not to be so limited since changes and alterations therein may be made which are within the full intended scope of this invention as defined by the appended claims.

What is claimed is:
1. The compounds

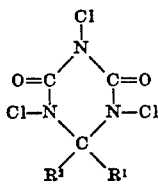

wherein $R^1$ and $R^2$ are selected from the group consisting of hydrogen atoms, lower alkyl and phenyl, at least one of $R^1$ and $R^2$ being hydrogen.

2. 1,3,5-trichloro-2,4-dioxohexahydro-1,3,5-triazine.

3. 6 - phenyl - 1,3,5 - trichloro - 2,4 - dioxohexahydro-1,3,5-triazine.

References Cited in the file of this patent

UNITED STATES PATENTS

| | | |
|---|---|---|
| 1,549,120 | Hendry | Aug. 11, 1925 |
| 2,171,901 | Wilson et al. | Sept. 5, 1939 |
| 2,184,883 | Muskat et al. | Dec. 26, 1939 |
| 2,578,270 | Strain | Dec. 11, 1951 |
| 2,607,738 | Hardy | Aug. 19, 1952 |
| 2,658,099 | Basset | Nov. 3, 1953 |
| 2,763,618 | Hendrix | Sept. 16, 1956 |
| 2,779,764 | Paterson | Jan. 29, 1957 |
| 2,824,823 | Wolf | Feb. 25, 1958 |
| 2,828,308 | Lorenz | Mar. 25, 1958 |
| 2,838,511 | Kogen | June 10, 1958 |
| 2,868,787 | Paterson | Jan. 13, 1959 |
| 2,897,154 | Low | July 28, 1959 |
| 2,913,460 | Brown et al. | Nov. 17, 1959 |
| 2,964,525 | Robinson | Dec. 13, 1960 |

FOREIGN PATENTS

| | | |
|---|---|---|
| 1,149,758 | France | July 22, 1957 |

OTHER REFERENCES

Herzig Montashefte fur Chemie, vol. 2, pages 406–409 (1881).

Beilstein: Handbuck der Organische Chemie IV Auflage, Band XXVI, pages 221, 222 (1937).

Sobotak et al.: Jour. Am. Chem. Soc., vol 59, pages 2606–2608 (1937).

Beilstein: Handbuck der Organische Chemie IV Auflage, Band XXVI, page 66 (1938).

Bloch et al.: Jour. Am. Chem. Soc., vol. 60, pages 1656–1658 (1938).